United States Patent
Wu et al.

(10) Patent No.: US 10,969,827 B2
(45) Date of Patent: Apr. 6, 2021

(54) ELECTRONIC DEVICE AND METHOD FOR CONTROLLING USER INTERFACE THEREIN

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wei Wu, Shenzhen (CN); Hsu-Min Kuo, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/421,809

(22) Filed: May 24, 2019

(65) Prior Publication Data

US 2019/0361500 A1    Nov. 28, 2019

(30) Foreign Application Priority Data

May 24, 2018 (CN) .......................... 201810507015.5

(51) Int. Cl.
  *G06F 1/16* (2006.01)
  *G06F 3/01* (2006.01)
  *G06K 9/00* (2006.01)
  *G06F 3/0482* (2013.01)

(52) U.S. Cl.
  CPC ............ *G06F 1/1639* (2013.01); *G06F 3/017* (2013.01); *G06F 3/0482* (2013.01); *G06K 9/00369* (2013.01); *G06K 9/00375* (2013.01)

(58) Field of Classification Search
  None
  See application file for complete search history.

(56) References Cited

U.S. PATENT DOCUMENTS

| | | | | |
|---|---|---|---|---|
| 2011/0138285 A1* | 6/2011 | Kuo | ................ | G06F 3/167 715/727 |
| 2012/0017147 A1* | 1/2012 | Mark | ................ | H04N 9/3173 715/702 |
| 2014/0298271 A1* | 10/2014 | Jakubiak | ............ | G06F 3/04883 715/856 |
| 2015/0153893 A1* | 6/2015 | Park | ................ | G06F 3/0488 345/173 |
| 2016/0179205 A1* | 6/2016 | Katz | ................ | G06F 3/013 345/156 |
| 2016/0313816 A1* | 10/2016 | Krishnakumar | ...... | G06F 3/0338 |
| 2016/0334875 A1* | 11/2016 | Kandadai | ................ | G06F 3/017 |
| 2017/0160924 A1* | 6/2017 | Xie | ................ | G06F 3/04886 |
| 2018/0007328 A1* | 1/2018 | Kursula | ................ | H04N 9/3194 |
| 2018/0367771 A1* | 12/2018 | Staton | ................ | H04N 9/3173 |
| 2019/0102043 A1* | 4/2019 | Lee | ................ | G06F 3/01 |

* cited by examiner

*Primary Examiner* — Toan H Vu
(74) *Attorney, Agent, or Firm* — ScienBiziP, P.C.

(57) ABSTRACT

A method for controlling a user interface of an electronic device by providing for the benefit of a user a projection of an operating interface includes a projection device to project an operating interface on a surface and controlling a detecting device to detect control operations on the projected interface by the user. A type of the user's control operation is determined, wherein the types of the control operations can include gestures and touch operations. The electronic device is controlled to perform a function in response to the touch operation or the gesture operation.

12 Claims, 4 Drawing Sheets

ELECTRONIC DEVICE AND METHOD FOR CONTROLLING USER INTERFACE THEREIN

CROSS-REFERENCE TO RELATED APPLICATIONS

This application claims priority to Chinese Patent Application No. 201810507015.5 filed on May 24, 2018, the contents of which are incorporated by reference herein.

FIELD

The subject matter herein generally relates to control technology of electronic devices, and particularly to an electronic device and a method for controlling a user interface of the electronic device.

BACKGROUND

Electronic devices, particularly smart devices, such as smart phones, smart watches etc., are miniaturized. User interfaces of smart electronic devices must be correspondingly smaller. When functions of an application in the smart electronic devices are complex, users cannot conveniently perform operations on a very small interface.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
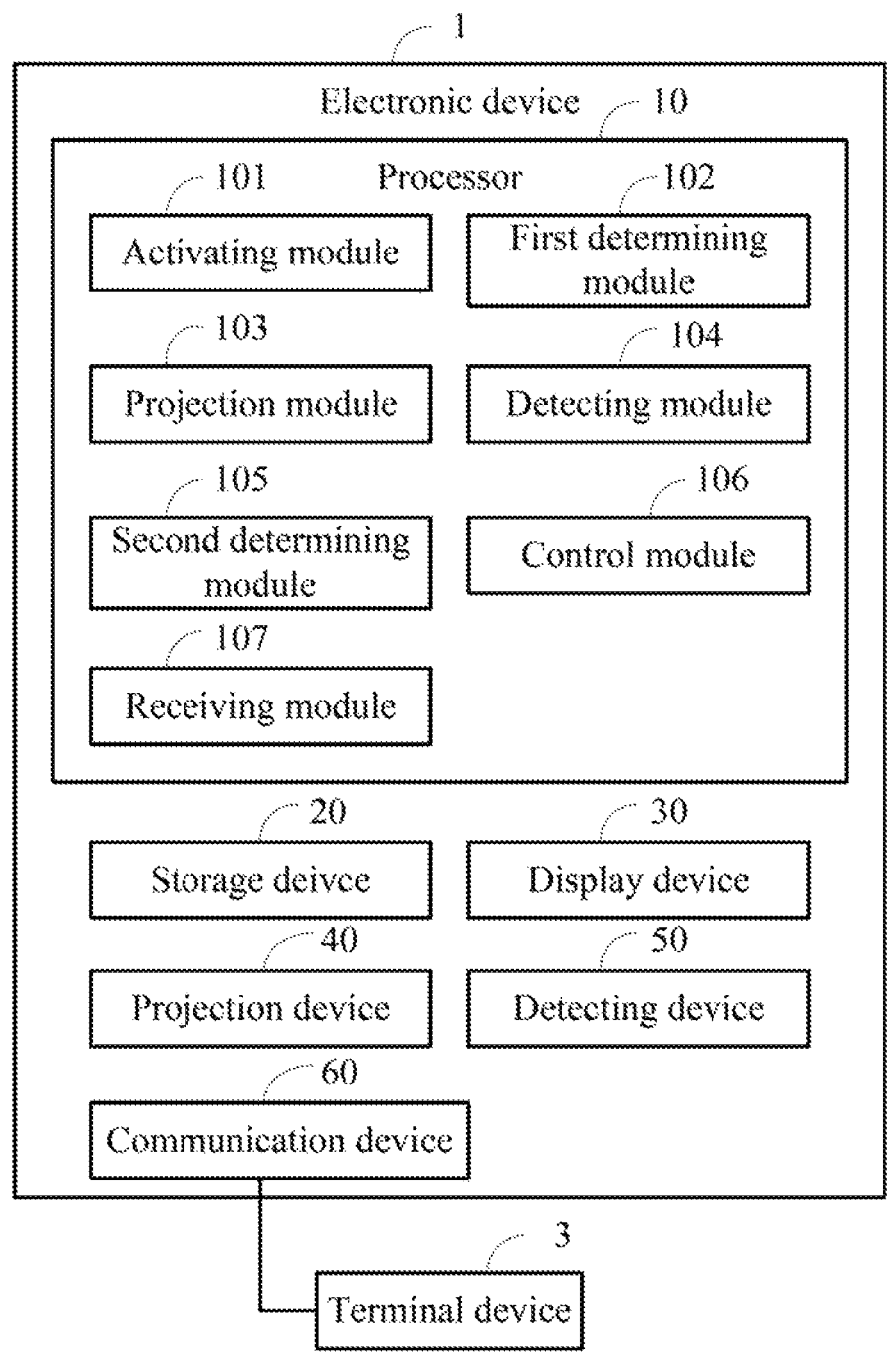
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an embodiment of an electronic device 1. The electronic device 1 can project an operation interface 100 onto other carriers, and a user can perform operations on the carrier to control the electronic device 1. In at least one embodiment, the electronic device 1 can be a smart phone, a tablet computer, or a smart watch.

Figure 2:
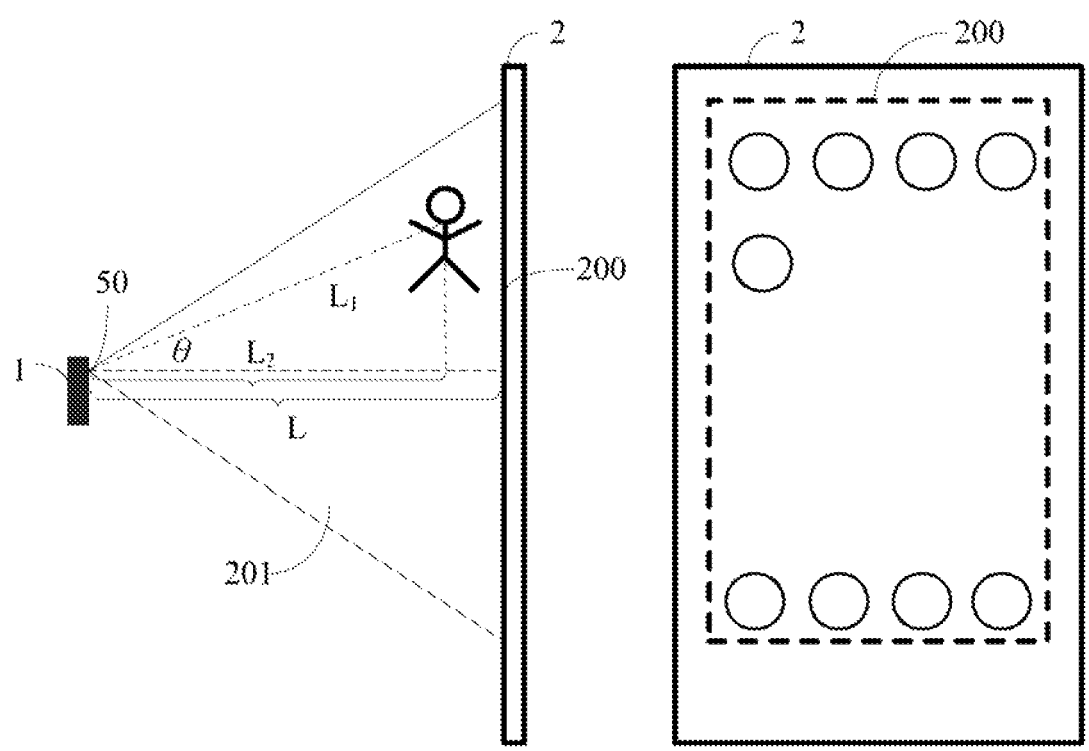
FIG. 2 is a schematic diagram of an embodiment of an interface projected by the electronic device.

Referring to FIG. 2, the electronic device 1 can project the operation interface 100 onto a projection carrier 2, and then a projected interface 200 is formed. In at least one embodiment, the projection carrier 2 can be a display screen, a curtain, or any flat surface.

The electronic device 1 includes, but is not limited to, a processor 10, a storage device 20, a display device 30, a projection device 40, a detecting device 50, and a communication device 60. FIG. 1 illustrates only one example of the electronic device 1, other examples can include more or fewer components than illustrated, or have a different configuration of the various components in other embodiments.

The at least one processor 10 can be a central processing unit (CPU), a microprocessor, or other data processor chip that performs functions of the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium. In at least one embodiment, the storage device 20 stores a number of applications of the electronic device 1.

In at least one embodiment, the display device 30 can be a touch screen. The display device 30 displays the operation interface 100 of the electronic device 1.

In at least one embodiment, the projection device 40 can be a projector. The projection device 40 is arranged in the electronic device 1 as an internal component. In other embodiment, the projection device 40 also can be an external device which is electrically connected with the electronic device 1. The projection device 40 can also communicate with the electronic device 1 through the communication device 60.

In at least one embodiment, the detecting device 50 can be an infrared camera. The detecting device 50 is integrated with at least one infrared sensor. The detecting device 50 can capture infrared images, transmit infrared rays, and receive reflected infrared rays. In other embodiments, the detecting device 50 can include at least one infrared camera and at least one common camera. The infrared camera can capture infrared images, and the common camera can capture normal or life-like images.

In at least one embodiment, the communication device 60 can be a BLUETOOTH module or a WI-FI module. The electronic device 1 can communicate with other electronic devices through the communication device 60.

As illustrated in FIG. 1, the processor 10 at least includes an activating module 101, a first determining module 102, a projection module 103, a detecting module 104, a second determining module 105, a control module 106, and a receiving module 107. The modules 101-107 can be collections of software instructions stored in the storage device 20 of the electronic device 1 and executed by the processor 10. The modules 101-107 also can include functionality represented as hardware or integrated circuits, or as software and hardware combinations, such as a special-purpose processor or a general-purpose processor with special-purpose firmware.

The activating module 101 is used to activate a projection function of the electronic device 1 in response to input operations on the electronic device 1 from a user.

Figure 3:
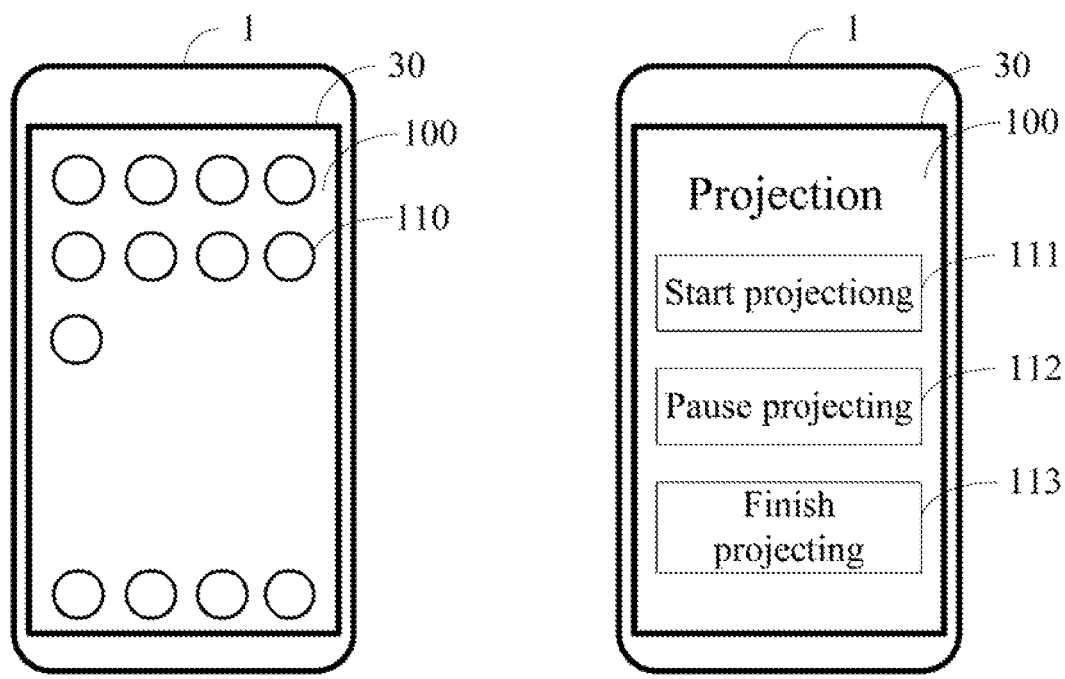
FIG. 3 is a schematic diagram of an embodiment of an operation interface of the electronic device

Referring to FIG. 3, a projection application 110 is included in the electronic device 1. When the projection application 110 is activated, an application interface of the projection application 110 at least displays an option 111 of start projecting, an option 112 of pause projecting, and an option 113 of finish projecting. The input operations of the user include activating the projection application 110 and clicking the option of start projecting. When detecting the input operations of the user, the activating module 101 activates the projection function of the electronic device 1.

The first determining module 102 is used to determine whether a distance between the electronic device 1 and the projection carrier 2 is less than or equal to a predetermined distance.

In at least one embodiment, the first determining module 102 controls the detecting device 50 to acquire the distance between the electronic device 1 and the projection carrier 2, and then determines whether the detected distance is less than or equal to the predetermined distance. In at least one embodiment, the predetermined distance can be four meters or other suitable value.

In detail, when the electronic device 1 faces the projection carrier 2, the detecting device 50 transmits infrared rays to the projection carrier 2, and receives infrared rays reflected by the projection carrier 2. The detecting device 50 calculates the distance between the electronic device 1 and the projection carrier 2, according to a time interval between transmitting the infrared rays and receiving the reflected infrared rays, and a propagation velocity of the infrared ray.

When the distance between the electronic device 1 and the projection carrier 2 is less than or equal to the predetermined distance, the projection module 103 is used to control the projection device 40 to project the operation interface 100 of the electronic device 1 onto the projection carrier 2, to form a projected interface 200.

In at least one embodiment, the projection device 40 projects the operation interface 100 onto the projection carrier 2 according to a predetermined proportion, that is, a predefined relationship in proportions. Positions of objects on the projected interface 200 including icons and options corresponding to positions of such objects on the operation interface 100, and the predetermined proportion is applied between sizes of the objects on the projected interface 200 and those on the operation interface 100. In at least one embodiment, the predetermined proportion can be five-to-one.

The detecting module 104 is used to control the detecting device 50 to detect control operations on the projected interface 200 and a predetermined area. The second determining module 105 is used to determine a type of the control operations on the projected interface 200 and the predetermined area.

As illustrated in FIG. 2, the predetermined area is an area 201 which is located between the detecting device 50 and the projection carrier 2. The types of the control operations at least include gesture operations and touch operations. The gesture operations can be applied on the area 201, and the touch operations can be applied on the projected interface 200.

The detecting device 50 detects the control operations by capturing infrared images of the positions and movements of the user.

As illustrated in FIG. 2, in detail, the detecting device 50 transmits the infrared rays to the projected interface 200 and the area 201. When the user is in the area 201, the detecting device 50 can capture the infrared images of the user When the detecting device 50 has captured the infrared images of the user, the detecting module 104 further controls the detecting device 50 to detect whether a vertical distance between the user and the detecting device 50 is within a predefined distance range. As illustrated in FIG. 2, when the user is in the area 201, the detecting device 50 determines a straight-line distance $L_1$ between the user and the detecting device 50 by transmitting the infrared rays and receiving the infrared rays reflected by the user's body. The detecting device 50 further determines an angle θ between a direction of the user and a direction perpendicular to the projection carrier 2, according to the reflected infrared rays. The detecting module 104 calculates the vertical distance $L_2$ between the user and the detecting device 50 according to equation $L_2=L_1 \cos θ$, and determines whether the vertical distance $L_2$ is within the predefined distance range.

In at least one embodiment, the predefined distance range is $L-\Delta L \sim L+\Delta L$, where L is the distance between the detecting device 50 and the projection carrier 2, and $\Delta L$ is a compensating distance for reducing errors. For example, when the vertical distance L is three meters, the compensating distance $\Delta L$ is five centimeters, and the predefined distance range is 2.95 meters-3.05 meters.

When the detecting module 104 determines that the vertical distance between the user and the detecting device 50 is within the predefined distance range, the second determining module 105 determines that control operations are being performed on the projected interface 200 by the user, at this time, the control operations are determined as touch operations. When the detecting module 104 determines that the vertical distance between the user and the detecting device 50 is not in the predefined distance range, the second determining module 105 determines that the user is giving control operations in the area 201, at this time, the control operations are determined as gesture operations.

In at least one embodiment, when the second determining module 105 determines that the touch operations are being carried out on the projected interface 200 by the user, the detecting device 50 determines a position of at least one finger of the user by transmitting the infrared rays to the projected interface 200 and receiving the infrared rays reflected by the at least one finger. At the same time, the detecting device 50 detects movements of the at least one finger by means of capturing the infrared images of the user.

Thus, the detecting module 104 can determine a target object of the touch operations according to the determined positions of the touch operations, and determine functions of the touch operations according to the movements of the at least one finger.

In at least one embodiment, the touch operations at least include click operation, zoom operation, and drag operation. When the detecting device 40 detects that the movements are a finger of the user touching the projected interface 200 once, the touch operation is determined as the click operation. When the detecting device 40 detects that the movements are two fingers of the user sliding on the projected interface 200, the touch operation is determined as the zoom operation. When the detecting device 40 detects that the movements are a finger of the user sliding on the projected interface 200 once, the touch operation is determined as the drag operation.

In at least one embodiment, the storage device 20 further stores a number of predefined gesture operations and corresponding functions. When the second determining module 105 determines that the gesture operations are being given in the area 201, the detecting device 50 captures the infrared images of the user at predetermined time intervals. The detecting module 104 acquires the gesture operation of the user by recognizing the captured infrared images, and determines whether the gesture operation is predefined.

The control module 106 is used to control the electronic device 1 to perform a corresponding function in response to the touch or gesture operations.

In detail, when the click operation is detected, the control module 106 activates the target object corresponding to the click operation, such as activating an application and opening an image. When the zoom operation is detected, the control module 106 zooms the target object corresponding to the zoom operation, such as zooming an image in or out. When the drag operation is detected, the control module 106 changes a position of the target object corresponding to the drag operation, such as switching desktops, or changing a position of a progress bar of a video or a song. That is, the touch operations performed on the projected interface 200 are equal to the touch operations which can be performed on the operation interface 100.

When the detecting module 104 determines that the gesture operation of the user has been predefined, the control module 106 controls the electronic device 1 to perform the corresponding function as stored in the storage device 20. For example, the predefined gesture operations at least include waving left, right, up, and down. Functions corresponding to waving left and right can be paging a document front and back, or skipping a video ahead and back. Functions corresponding to waving up and down can be paging a document up and down, or volume up and down. That is, when the electronic device 1 is displaying a document, if the user waves left, the electronic device 1 controls the document to page front. When the electronic device 1 is playing a video, if the user waves down, the electronic device 1 controls the video to volume down.

The projection module 103 is further used to project the operation interface 100 after the electronic device 1 performs the corresponding function onto the projection carrier 2.

In other embodiments, the electronic device 1 can communicate with an terminal device 3 through the communication unit 60. The receiving module 107 is used to receive an operating interface transmitted by the terminal device through the communication unit 60. The projection module 103 controls the projection device 40 to project the operation interface of the terminal device 3 onto the projection carrier 2, to form the projected interface 200, in response to user's operation. The control module 106 controls the terminal device 3 to perform a function in response to user's control operations performed on the projected interface 200 and the predetermined area.

In at least one embodiment, the terminal device can be a smart home appliance, such as an air conditioner, a rice cooker, or an electric fan etc. Thus, the electronic device 1 is convenient for users to understand status of such appliances, and carry out remote control of such appliance by projecting the operation interface of such appliance.

Figure 4:
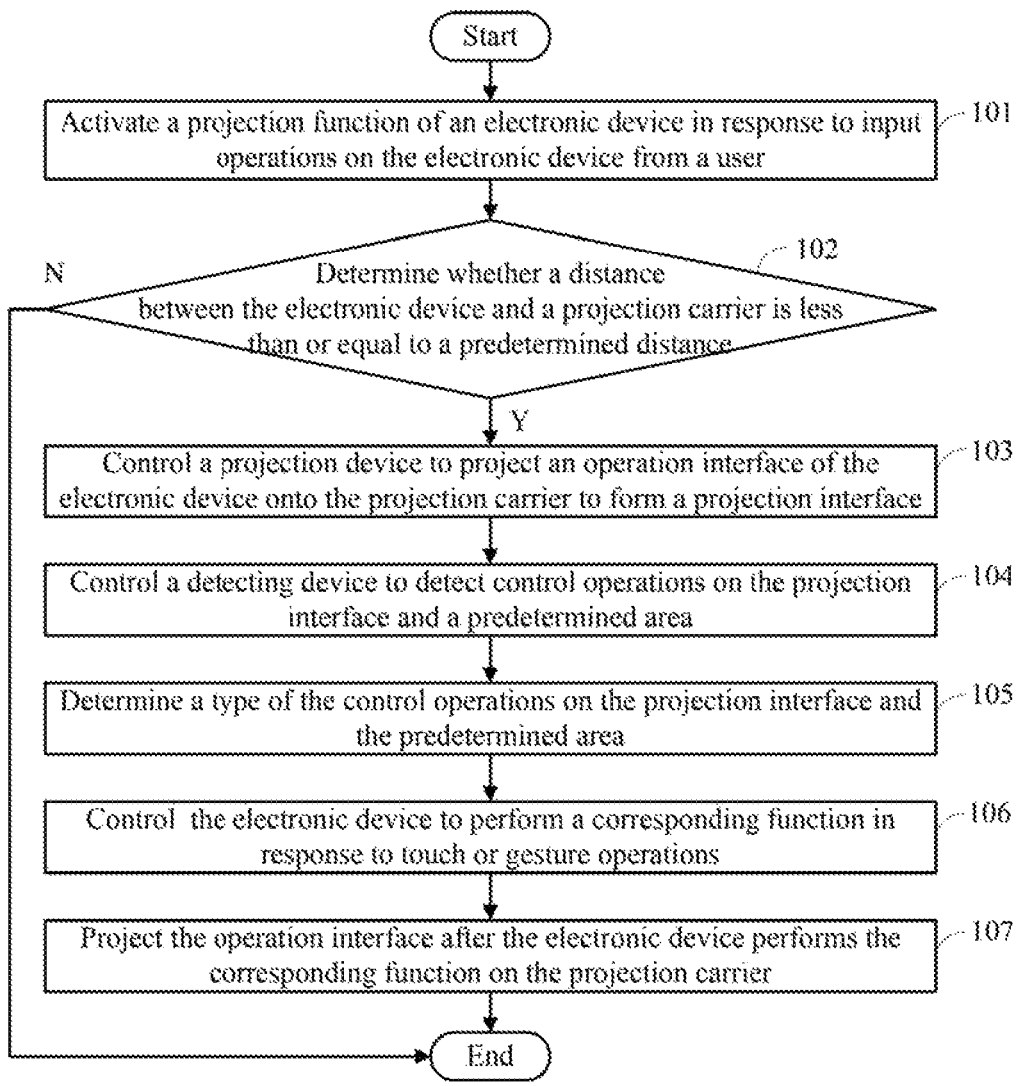
FIG. 4 illustrates a flowchart of an embodiment of a method for controlling a user interface.

FIG. 4 illustrates a flowchart of an embodiment of an operating control method of an electronic device. The method is provided by way of example, as there are a variety of ways to carry out the method. The method described below can be carried out using the configurations illustrated in FIG. 1, for example, and various elements of these figures are referenced in explaining the example method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, an activating module 101 activates a projection function of an electronic device 1 in response to input operations on the electronic device 1 from a user.

At block 102, a first determining module 102 determines whether a distance between the electronic device 1 and the projection carrier 2 is less than or equal to a predetermined distance. When the distance between the electronic device 1 and the projection carrier 2 is less than or equal to the predetermined distance, the process jumps to block 103. When the distance between the electronic device 1 and the projection carrier 2 is greater than the predetermined distance, the process ends.

At block 103, a projection module 103 controls the projection device 40 to project the operation interface 100 of the electronic device 1 onto the projection carrier 2 to form a projected interface 200.

At block 104, a detecting module 104 controls the detecting device 50 to detect control operations on the projected interface 200 and a predetermined area from the user.

At block 105, a second determining module 105 determines a type of the control operations on the projected interface 200 and the predetermined area.

At block 106, a control module 106 controls the electronic device 1 to perform a corresponding function in response to the touch or gesture operations.

At block 107, the projection module 103 further projects the operation interface 100 after the electronic device 1 performs the corresponding function on the projection carrier 2.

In other embodiments, the method further includes: a receiving module 107 receives an operating interface transmitted by a terminal device through the communication unit 60, the projection module 103 controls the projection device 40 to project the operation interface of the terminal device onto the projection carrier 2, to form the projected interface 200, in response to user's operation, and the control module 106 controls the terminal device to perform a function in response to user's control operations performed on the projected interface 200 and the predetermined area.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor;
   a project device coupled to the at least one processor;
   a detecting device coupled to the at least one processor; and
   a storage device coupled to the at least one processor and storing instructions for execution by the at least one processor to cause the at least one processor to:
   control the projection device to project an operation interface of the electronic device onto a projection carrier to form a projected interface;
   control the detecting device to detect control operations on the projected interface and a predetermined area from the user;
   determine a type of the control operations on the projected interface and the predetermined area, wherein the types of the control operations comprises gesture operations or touch operations;
       control the detecting device to detect whether a vertical distance between the user and the detecting device is within a predefined distance range;
       determine, when the vertical distance between the user and the detecting device is determined to be within the predefined distance range, the control operations of the user as touch operations;
       determine, when the vertical distance between the user and the detecting device is determined not within the predefined distance range, the control operations of the user as gesture operations; and
       control the electronic device to perform a corresponding function in response to the touch or gesture operations.

2. The electronic device according to claim 1, wherein the detecting device is an infrared camera, the detecting device detects the control operations by capturing infrared images of the positions and movements of the user.

3. The electronic device according to claim 1, wherein the at least one processor is further caused to:
   determine whether a distance between the electronic device and the projection carrier is less than or equal to a predetermined distance; and
   control, when the distance between the electronic device and the projection carrier is less than or equal to the predetermined distance, the projection device to project the operation interface onto the projection carrier to form the projected interface.

4. The electronic device according to claim 1, further comprising:
   a communication device coupled to the at least one processor and communicating with a terminal device, wherein the at least one processor is further caused to:
   receive an operating interface transmitted by the terminal device through the communication device;
   control the projection device to project the operation interface of the terminal device onto the projection carrier to form the projected interface; and
   control the terminal device to perform a function in response to the user's control operations performed on the projected interface and the predetermined area.

5. A method for controlling a user interface of an electronic device comprising:
   controlling a projection device to project an operation interface of the electronic device onto a projection carrier to form a projected interface;
   controlling a detecting device to detect control operations on the projected interface and a predetermined area from the user;
   determining a type of the control operations on the projected interface and the predetermined area, wherein the types of the control operations comprises gesture operations or touch operations;
       wherein the step of determining a type of the control operations on the projected interface and the predetermined area comprises:
       controlling the detecting device to detect whether a vertical distance between the user and the detecting device is within a predefined distance range;
       determining, when the vertical distance between the user and the detecting device is determined to be within the predefined distance range, the control operations of the user as touch operations;
       determining, when the vertical distance between the user and the detecting device is determined not within the predefined distance range, the control operations of the user as gesture operations; and
   controlling the electronic device to perform a corresponding function in response to the touch or gesture operations.

6. The method according to claim 5, wherein the detecting device is an infrared camera, the detecting device detects the control operations by capturing infrared images of positions and movements of the user.

7. The method according to claim 5, further comprising:
   determining whether a distance between the electronic device and the projection carrier is less than or equal to a predetermined distance; and
   controlling, when the distance between the electronic device and the projection carrier is less than or equal to the predetermined distance, the projection device to project the operation interface onto the projection carrier to form the projected interface.

8. The method according to claim 5, further comprising:
   receiving an operating interface transmitted by a terminal device through a communication device;
   controlling the projection device to project the operation interface of the terminal device onto the projection carrier to form the projected interface; and
   controlling the terminal device to perform a function in response to user's control operations performed on the projected interface and the predetermined area.

9. A non-transitory storage medium having instructions stored thereon, when the instructions are executed by a processor of an electronic device, the processor is configured to perform a method for controlling a user interface, wherein the method comprises:
   controlling a projection device to project an operation interface of the electronic device onto a projection carrier to form a projected interface;
   controlling a detecting device to detect control operations on the projected interface and a predetermined area from the user;
   determining a type of the control operations on the projected interface and the predetermined area, wherein the types of the control operations comprises gesture operations or touch operations;
       wherein the step of determining a type of the control operations on the projected interface and the predetermined area comprises:

controlling the detecting device to detect whether a vertical distance between the user and the detecting device is within a predefined distance range;

determining, when the vertical distance between the user and the detecting device is determined to be within the predefined distance range, the control operations of the user as touch operations;

determining, when the vertical distance between the user and the detecting device is determined not within the predefined distance range, the control operations of the user as gesture operations; and controlling the electronic device to perform a corresponding function in response to the touch or gesture operations.

10. The non-transitory storage medium according to claim 9, wherein the detecting device is an infrared camera, the detecting device detects the control operations by capturing infrared images of positions and movements of the user.

11. The non-transitory storage medium according to claim 9, further comprising:

determining whether a distance between the electronic device and the projection carrier is less than or equal to a predetermined distance; and controlling, when the distance between the electronic device and the projection carrier is less than or equal to the predetermined distance, the projection device to project the operation interface onto the projection carrier to form the projected interface.

12. The non-transitory storage medium according to claim 9, further comprising:

receiving an operating interface transmitted by a terminal device through a communication device;

controlling the projection device to project the operation interface of the terminal device onto the projection carrier to form the projected interface; and controlling the terminal device to perform a function in response to user's control operations performed on the projected interface and the predetermined area.

* * * * *